United States Patent
Kudo

(10) Patent No.: US 9,921,454 B2
(45) Date of Patent: Mar. 20, 2018

(54) IMAGING APPARATUS CAPABLE OF GENERATING AN IMAGE WITH A WEIGHT OF A SIGNAL CORRESPONDING TO EACH TYPE OF SPECTRAL SENSITIVITY CHARACTERISTICS AND METHOD OF CONTROLLING THE APPARATUS

(71) Applicant: CANON KABUSHIKI KAISHA, Tokyo (JP)

(72) Inventor: Hiroshi Kudo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/087,690

(22) Filed: Mar. 31, 2016

(65) Prior Publication Data
US 2016/0299406 A1  Oct. 13, 2016

(30) Foreign Application Priority Data
Apr. 7, 2015  (JP) ................................. 2015-078325

(51) Int. Cl.
*H04N 5/225* (2006.01)
*G03B 7/0997* (2014.01)
(Continued)

(52) U.S. Cl.
CPC ......... *G03B 7/09971* (2015.01); *G03B 13/06* (2013.01); *G03B 13/16* (2013.01);
(Continued)

(58) Field of Classification Search
CPC ............ G03B 7/09971; G03B 7/09976; G03B 13/02; G03B 13/08; G03B 13/24;
(Continued)

(56) References Cited

U.S. PATENT DOCUMENTS 5,515,131 A * 5/1996 Ohmori .................. A61B 3/113 396/51
6,222,622 B1 * 4/2001 Hirai .................. G03B 7/09979 356/213

(Continued)

FOREIGN PATENT DOCUMENTS

JP 2012-034130 A 2/2012
JP 2012-154694 A 8/2012

*Primary Examiner* — Ngoc-Yen Vu
(74) *Attorney, Agent, or Firm* — Canon USA Inc., IP Division

(57) ABSTRACT

An imaging apparatus includes a photometric lens for forming a secondary image of object light that has been transmitted through a lens unit and had a primary image formed by the lens unit, a photometric sensor for outputting a signal of the object light that has had the secondary image formed, and a PN liquid crystal panel located in the vicinity of a primary imaging plane. The imaging apparatus generates an image obtained by subjecting an output signal of the photometric sensor to reforming processing on the basis of an output signal of the photometric sensor when the PN liquid crystal panel serves as an object. Thus, the imaging apparatus can suppress a deterioration in the image that could be caused by various factors including a manufacturing error, a change over time, a change in temperature, and a change in humidity.

8 Claims, 6 Drawing Sheets

(51) Int. Cl.
 *G03B 13/16* (2006.01)
 *G03B 13/36* (2006.01)
 *G03B 13/06* (2006.01)
 *H04N 5/232* (2006.01)
 *H04N 5/235* (2006.01)
 *G03B 13/00* (2006.01)

(52) U.S. Cl.
 CPC ........... *G03B 13/36* (2013.01); *H04N 5/2354* (2013.01); *H04N 5/23212* (2013.01); *H04N 5/23296* (2013.01)

(58) Field of Classification Search
 CPC .. G03B 13/36; H04N 5/2354; H04N 5/23212; H04N 5/23293
 USPC ........ 348/341, 345, 349, 357; 396/385, 386, 396/141, 150
 See application file for complete search history.

(56) References Cited

U.S. PATENT DOCUMENTS

| | | | |
|---|---|---|---|
| 6,963,388 B1 | 11/2005 | Ohta | |
| 7,652,710 B2 * | 1/2010 | Watanabe | G02B 7/32 348/333.09 |
| 7,702,237 B2 * | 4/2010 | Iwane | G03B 17/20 396/141 |
| 8,670,044 B2 * | 3/2014 | Takeuchi | G03B 7/091 348/229.1 |
| 2009/0052769 A1 | 2/2009 | Kang et al. | |
| 2010/0103305 A1 | 4/2010 | Suda et al. | |

\* cited by examiner

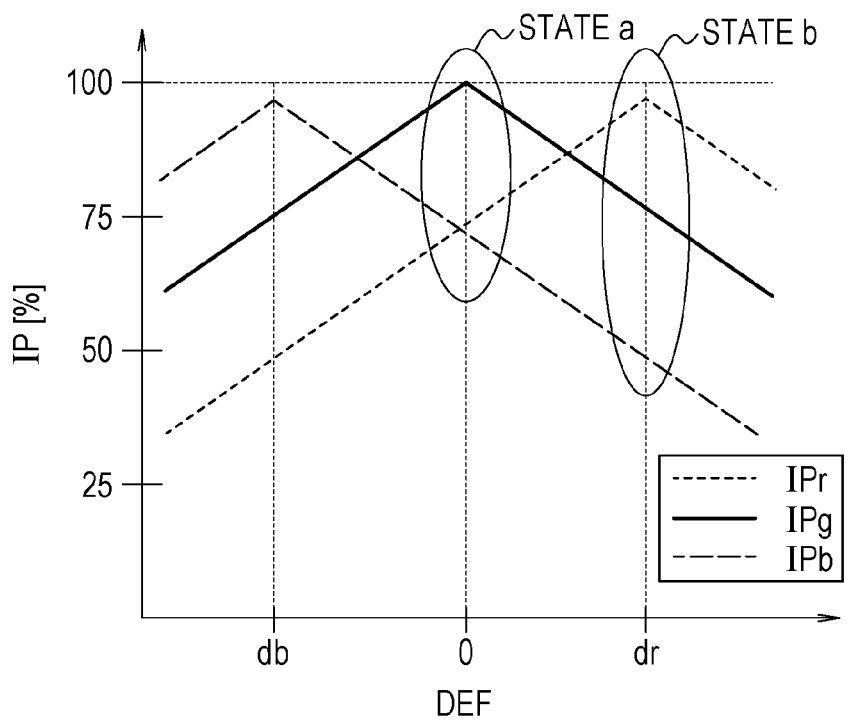

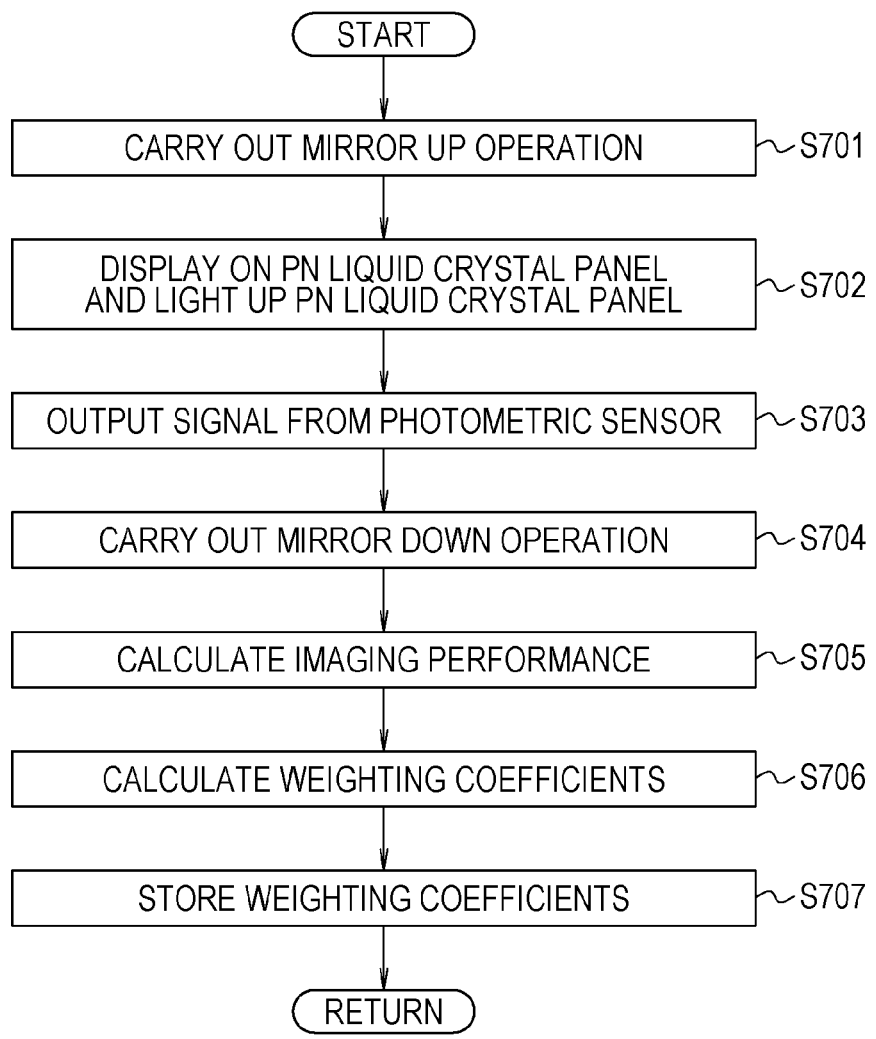

IMAGING APPARATUS CAPABLE OF GENERATING AN IMAGE WITH A WEIGHT OF A SIGNAL CORRESPONDING TO EACH TYPE OF SPECTRAL SENSITIVITY CHARACTERISTICS AND METHOD OF CONTROLLING THE APPARATUS

BACKGROUND OF THE INVENTION

Field of the Invention

The present invention relates to imaging apparatuses, such as single-lens reflex cameras, and methods of controlling the imaging apparatuses.

Description of the Related Art

Some imaging apparatuses, such as single-lens reflex cameras, are equipped with a focus detection system for detecting the focus condition of a photographing lens through a phase difference detection method and an object detection system for detecting an object, such as a person, present within a field on the basis of light diffused by a focus detection plate. Such focus detection system and object detection system are constituted by a secondary imaging optical system for forming a secondary image of object light that has been transmitted through the photographing lens and has had a primary image formed thereby and an image sensor for outputting a signal of an object image that is a secondary image formed by the secondary imaging optical system. The focus detection system or the object detection system detects the focus condition or detects the object with the use of an image generated on the basis of an output signal of the image sensor.

However, due to the size or cost constraint of the imaging apparatus, the secondary imaging optical system is constituted by a small number of lenses and often has aberration, such as on-axis chromatic aberration. In addition, the imaging performance of the secondary imaging optical system may deteriorate due to various factors including a manufacturing error of the imaging apparatus, a change over time, a change in temperature, and a change in humidity. Accordingly, the resolution of an image used in the focus detection system or the object detection system may deteriorate, leading to a problem in that the detection accuracy of these systems decreases.

With respect to such a problem, Japanese Patent Laid-Open No. 2012-34130, for example, discloses the following configuration that is directed to suppressing a deterioration in the image quality that could be caused by a change in the temperature of an optical system. Specifically, a change in the imaging performance of the optical system that could be caused by a change in the temperature is converted to weights Wr, Wg, and Wb corresponding to respective primary color signals of R, G, and B, and the weights Wr, Wg, and Wb are stored in advance in an image processing unit. The weights Wr, Wg, and Wb are set as appropriate in response to an output of a temperature measuring element, and aberration is thus corrected.

However, the conventional technique disclosed in Japanese Patent Laid-Open No. 2012-34130 targets only a change in the imaging performance of the optical system associated with a change in the temperature.

What causes the imaging performance of the optical system to change includes, in addition to a change in the temperature, a change in the dimensions of a photometric lens or of a member for holding the photometric lens that could be caused by factors including a manufacturing error, a change in humidity, a change over time, or the like. Accordingly, the conventional technique disclosed in Japanese Patent Laid-Open No. 2012-34130 faces an issue that a deterioration in an image caused by a factor other than a change in the temperature cannot be suppressed.

SUMMARY OF THE INVENTION

An aspect of the present invention provides an imaging apparatus that includes a secondary imaging optical system configured to form a secondary image of object light that has had a primary image formed, an image sensor having two or more types of spectral sensitivity characteristics and configured to output a signal of an object image that is the secondary image formed by the secondary imaging optical system, and a signal processor configured to generate an image with a weight of a signal corresponding to each type of the spectral sensitivity characteristics output by the image sensor being varied on the basis of an output signal of the image sensor when a member in the vicinity of a primary imaging plane serves as an object.

Further features of the present invention will become apparent from the following description of exemplary embodiments with reference to the attached drawings.

BRIEF DESCRIPTION OF THE DRAWINGS

FIG. 4 is a characteristic diagram illustrating the relation between a defocus amount and imaging performance.

FIG. 5 is a table for describing the relation between the imaging performance and weighting coefficients.

FIG. 7 is a flowchart illustrating the details of a weighting coefficient acquisition operation in the flowchart illustrated in FIG. 6.

DESCRIPTION OF THE EMBODIMENTS

Hereinafter, exemplary embodiments of the present invention will be described with reference to the appended drawings.

Figure 1:
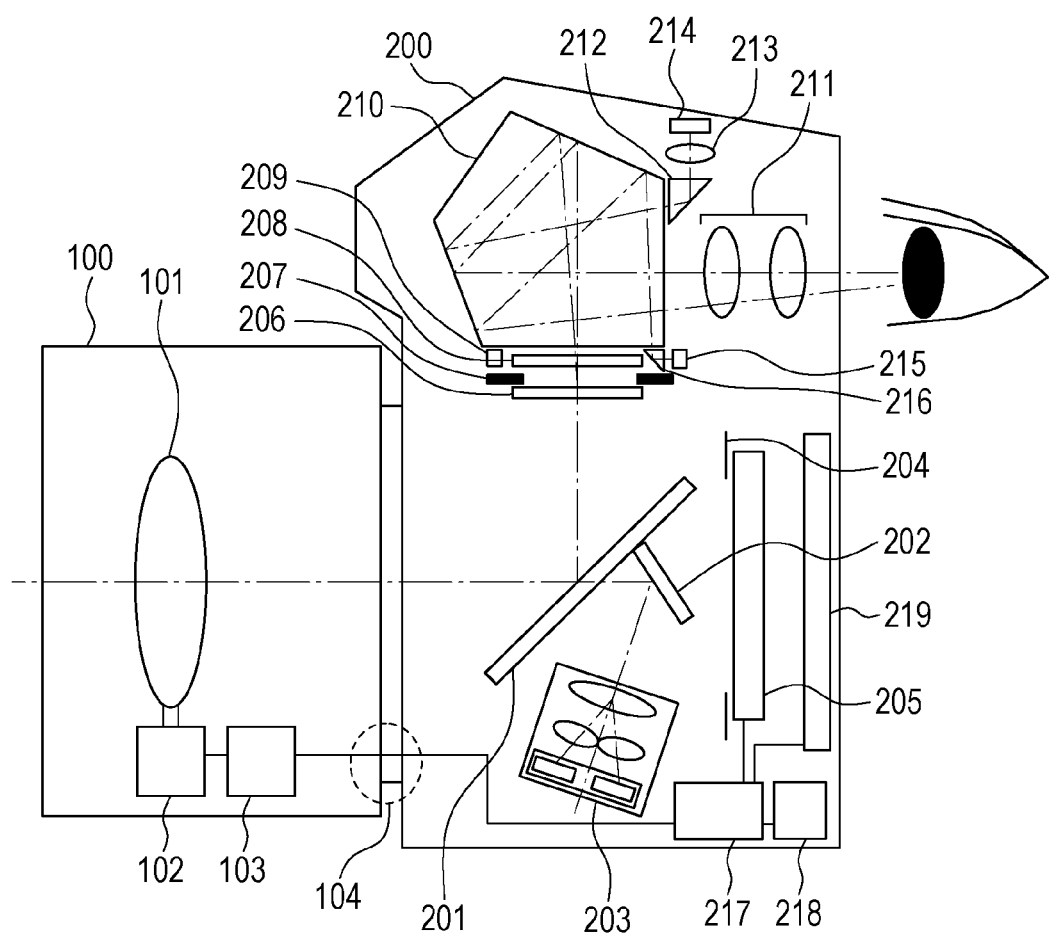
FIG. 1 illustrates a schematic internal configuration of a single-lens reflex camera according to an exemplary embodiment.

FIG. 1 illustrates a schematic configuration of a single-lens reflex camera (hereinafter, referred to as a camera) according to the present exemplary embodiment.

As illustrated in FIG. 1, a lens unit (photographing lens) 100 is detachably attached to a camera main body 200 with a lens mounting mechanism of a mount unit interposed therebetween. The mount unit is provided with an electrical contact unit 104. The camera main body 200 communicates with the lens unit 100 via the electrical contact unit 104 and controls a focusing lens 101 in the lens unit 100. Although FIG. 1 illustrates only the focusing lens 101 as a lens in the lens unit 100, a zoom lens, a fixed lens, or the like may additionally be provided.

A light flux from an object is guided to a main mirror 201 in the camera main body 200 via the lens unit 100. The main mirror 201 is disposed in an photographing optical path obliquely relative to the optical axis and can be moved between a first position (the position depicted in the FIG. 1) at which the main mirror 201 guides the light flux from the object toward a viewfinder optical system located above the main mirror 201 and a second position at which the main mirror 201 is retracted to the outside of the photographing optical path.

A center portion of the main mirror 201 is constituted by a half-silvered mirror, and when the main mirror 201 is in the first position, some of the light flux from the object is transmitted through this half-silvered mirror portion. The light flux that has been transmitted through the half-silvered mirror portion is reflected by a sub-mirror 202 provided on the back side of the main mirror 201, and the reflected light flux is guided to a focus detection device 203. Meanwhile, the light flux that has been reflected by the main mirror 201 has a primary image formed on a focus detection plate 206 disposed at a position optically conjugate to an image sensor 205. The light (object image) that has been diffused by and transmitted through the focus detection plate 206 passes through a viewfinder field frame 207, is transmitted through a PN liquid crystal panel 208, and is transformed to an erected image by a pentaprism 210. The erected image is enlarged by the eyepiece 211 and is observed by the user.

The viewfinder field frame 207 is disposed in the vicinity of the focus detection plate 206 and blocks a peripheral portion of the light that has been diffused by and transmitted through the focus detection plate 206 so as to allow the user to visually recognize an area to be imaged by the image sensor 205.

The PN liquid crystal panel 208 is disposed in the vicinity of the focus detection plate 206. The PN liquid crystal panel 208 displays the status of a focus detection operation, displays a focus detection area, and provides such pieces of information to the user who is looking into the optical viewfinder.

A PN liquid crystal panel illumination device 209 illuminates the PN liquid crystal panel 208 and lights up the display of the PN liquid crystal panel 208. A light source color of the PN liquid crystal panel illumination device 209 is typically red, but the PN liquid crystal panel illumination device 209 can also illuminate with white light in the present exemplary embodiment for the reasons described later.

Some of the light that has been diffused by and transmitted through the focus detection plate 206 is bent by a photometric prism 212, is transmitted through a photometric lens 213, and has a secondary image formed on a photometric sensor 214, and the secondary image is received by the photometric sensor 214.

An in-viewfinder display unit 215 displays various pieces of photographing information of the camera, including the aperture value and the shutter speed. The light flux from the in-viewfinder display unit 215 is bent by an in-viewfinder display unit prism 216, transmitted through the pentaprism 210 and the eyepiece 211, and observed by the user.

When the main mirror 201 is moved up to the second position, the sub-mirror 202 is folded against the main mirror 201 and is retracted to the outside of the photographing optical path as well. Thus, the light flux from the lens unit 100 passes through a focal plane shutter 204, which is a mechanical shutter, and reaches the image sensor 205. The focal plane shutter 204 regulates the quantity of light to be incident on the image sensor 205. The image sensor 205 is constituted by a photoelectric conversion element, such as a charge coupled device (CCD) sensor or a complementary metal-oxide semiconductor (CMOS) sensor, that outputs an electric signal, and the image sensor 205 photoelectrically converts the object image formed by the lens unit 100 and generates an image.

The camera main body 200 includes a central processing unit (CPU) 217, which controls the camera as a whole. The CPU 217 communicates with a lens control circuit 103 in the lens unit 100 via the electrical contact unit 104. The lens control circuit 103 controls a lens driving mechanism 102 in accordance with a signal from the CPU 217 and drives the focusing lens 101 in the optical axis direction so as to bring the focusing lens 101 into focus. The lens driving mechanism 102 includes a stepping motor serving as a driving source.

In addition, the CPU 217 is connected to an electrically erasable programmable read-only memory (EEPROM) 218 serving as a storage unit. The EEPROM 218 stores a parameter that is to be adjusted in order to control the camera, camera ID (identification) information that is unique information for identifying a given camera, an adjustment value of a parameter related to photographing acquired in the process of manufacturing the camera, and so on.

In addition, the CPU 217 is connected to an operation detection unit (not illustrated) for transmitting the user's intention to the camera. The operation detection unit detects the operation of a release button, a selection button, and so on.

An exterior display unit 219 is a display device for displaying image data captured by the image sensor 205, items to be configured by the user, and so on and is typically constituted by a color liquid crystal display element. The CPU 217 is connected to a display control unit (not illustrated), and the display control unit controls the display on the exterior display unit 219, the in-viewfinder display unit 215, and the PN liquid crystal panel 208 and the light source of the PN liquid crystal panel illumination device 209.

Figure 2:
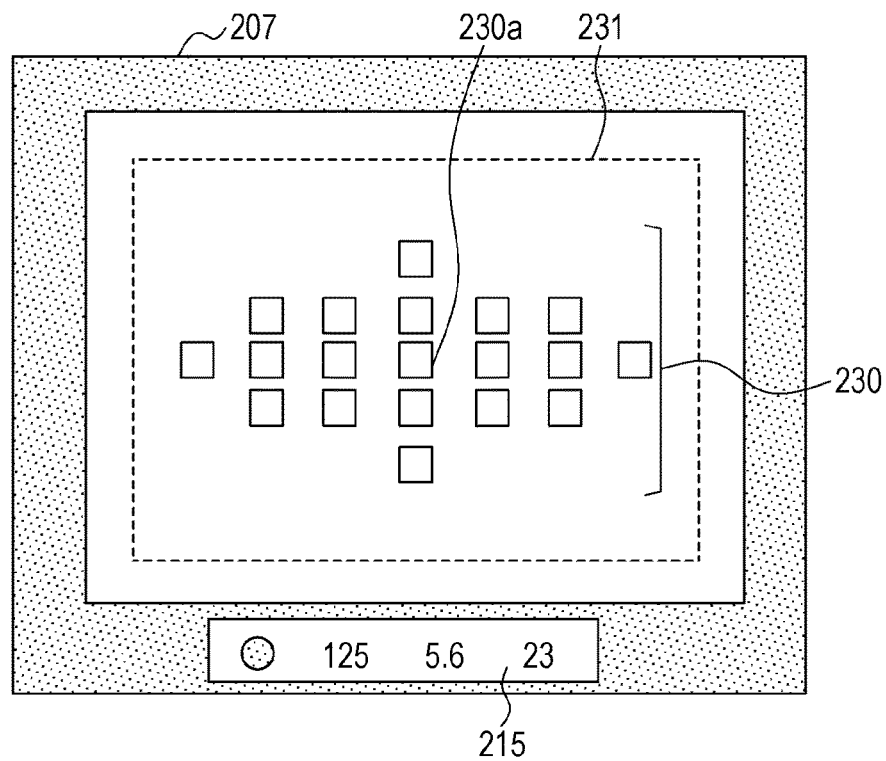
FIG. 2 illustrates an in-view finder display.

FIG. 2 illustrates an in-viewfinder display and illustrates the display that the user can visually recognize through the eyepiece 211.

The PN liquid crystal panel 208 displays focus detection areas 230. In the focus detection operation, the detection operation is carried out typically in a plurality of areas, and nineteen focus detection areas 230 are arranged in the present exemplary embodiment, as illustrated in FIG. 2. A focus detection area 230a is the center focus detection area among the focus detection areas 230.

A photometric area 231 corresponds to the sensitivity area of the photometric sensor 214 and is invisible to the user.

The PN liquid crystal panel 208 includes electrode patterns in the respective focus detection areas 230 and in other areas. As a voltage applied to each electrode pattern is controlled, the transparency and the nontransparency of each electrode pattern can be switched from one to another independently. In an area with an electrode pattern to which a voltage is not applied, the refractive index of liquid crystals in the PN liquid crystal panel 208 is not uniform, and thus the light is scattered by the PN liquid crystal panel 208. Thus, such an area is apparently nontransparent. Meanwhile, in an area with an electrode pattern to which a voltage is applied, the refractive index of liquid crystals in the PN liquid crystal panel 208 is uniform, and thus such an area is transparent. A nontransparent area of the PN liquid crystal panel 208 blocks the object light that has been diffused by and transmitted through the focus detection plate 206. In other words, by controlling the voltage applied to each electrode pattern, the PN liquid crystal panel 208 can be used as a light-blocking member. In the meantime, the object light is transmitted as-is through a transparent area of the PN liquid crystal panel 208. Thus, a contrast is produced between a transparent area and a nontransparent area of the PN liquid crystal panel 208, and the user who is looking into the optical viewfinder can visually recognize the display on the PN liquid crystal panel 208.

In addition, when the PN liquid crystal panel illumination device 209 illuminates the PN liquid crystal panel 208, the illumination light of the PN liquid crystal panel illumination device 209 is diffused in a nontransparent area of the PN liquid crystal panel 208. On the other hand, the illumination light of the PN liquid crystal panel illumination device 209 is not diffused in a transparent area of the PN liquid crystal panel 208. Thus, the user who is looking into the optical viewfinder can visually recognize the display on the PN liquid crystal panel 208.

Some of the object light that has been scattered by a nontransparent area of the PN liquid crystal panel 208 or transmitted through a transparent area of the PN liquid crystal panel 208 and some of the illumination light of the PN liquid crystal panel illumination device 209 that has been diffused by a nontransparent area of the PN liquid crystal panel 208 are transmitted through the photometric lens 213 and guided to the photometric sensor 214.

The operation of adjusting the focus of the camera according to the present exemplary embodiment will now be described.

The focus adjusting operation includes a focus detection operation of a phase difference detection method carried out by the focus detection device 203 and a lens driving operation of automatically driving the focusing lens 101 to an in-focus position with respect to the object.

The method of selecting a focus detection area includes an optional selection mode and an automatic selection mode, and the user selects one of the two modes.

In the optional selection mode, the user selects, as desired, one focus detection area corresponding to the position to which the user wants to bring the focus within a photographing range. In FIG. 2, in a state in which one of the nineteen focus detection areas 230 has been selected, for example, only the selected focus detection area 230 is displayed, and the remaining eighteen focus detection areas 230 are not displayed. Thus, the user can visually recognize only the selected focus detection area 230.

In the automatic selection mode, a focus detection area is automatically selected in accordance with a predetermined algorithm on the basis of the result of detecting the focus condition of each focus detection area. In the automatic selection mode, an object-prioritized automatic selection or a normal automatic selection is carried out on the basis of the result of the object detection operation, which will be described later. When the result of the object detection operation indicates that a predetermined object, such as a human face, is present within a field, the object-prioritized automatic selection of selecting a focus detection area corresponding to the position of the detected object is carried out. In other cases, the normal automatic selection is carried out in which a focus detection area corresponding to the position of the object closest to the camera in each area or the position of the object with a highest brightness difference (contrast) is selected on the basis of the defocus amount calculated in each focus detection area.

The operation of controlling the exposure of the camera according to the present exemplary embodiment will now be described.

In the exposure control operation, the control value of an aperture stop (not illustrated) in the lens unit 100 or the shutter speed control value of the focal plane shutter 204 is set on the basis of the exposure control value calculated through a photometry operation, which will be described later. Through such control values, light reaches the image sensor 205 in the quantity appropriate for the object, and a photograph of desired brightness can be taken.

The photometry operation is carried out with the use of the photometric lens 213 and the photometric sensor 214.

The photometric sensor 214 has two or more types of spectral sensitivity characteristics. The photometric sensor 214 is, for example, a high pixel density CCD in which pixels are arrayed in a matrix of 640 pixels (horizontal) by 480 pixels (vertical) at a pixel pitch of approximately 6 µm, and color filters in three colors of R, G, and B are disposed over the pixels in a Bayer array or in a stripe array. An acquired output of the photometric sensor 214 is subjected to YUV conversion processing, and thus a luminance signal and a color difference signal of the field can be acquired. The acquired signals are used to calculate an exposure control value, which will be described later. In addition, by combining the acquired output of the photometric sensor 214 with the primary color signals of R, G, and B with their weights being varied, as appropriate, a signal for detecting the object can be acquired, and such a signal is used to detect the object.

The photometric lens 213 is a lens having an imaging magnification of 0.15, for example, and forms a secondary image of the light that has been diffused by and transmitted through the focus detection plate 206 on the photometric sensor 214.

The photometric area 231 is an area of an object image that the photometric sensor 214 can observe and is an area in which the luminance value of the object image is acquired in the photometry operation. As illustrated in FIG. 2, the photometric area 231 is an area within the aperture of the viewfinder field frame 207. In the photometry operation, a low pixel density image (400 pixels) generated by roughly dividing the photometric area 231 into segments arranged in a matrix of 20 (horizontal) by 20 (vertical) (each segment has 32 by 24 pixels) is used. Once the luminance value is calculated from RGB sensor output values of 400 pixels, the field luminance can be detected on the basis of the sum or the mean value in each segment. With respect to the field luminance values in the 20 (horizontal) by 20 (vertical) segments obtained from the photometric sensor 214, in order to expose a primary object appropriately, the exposure control value is calculated through a predetermined weighting operation centered on the selected focus detection area 230.

Now, with reference to FIGS. 3A, 3B, and 4, the imaging performance of the photometric lens 213 will be described.

Figure 3A:
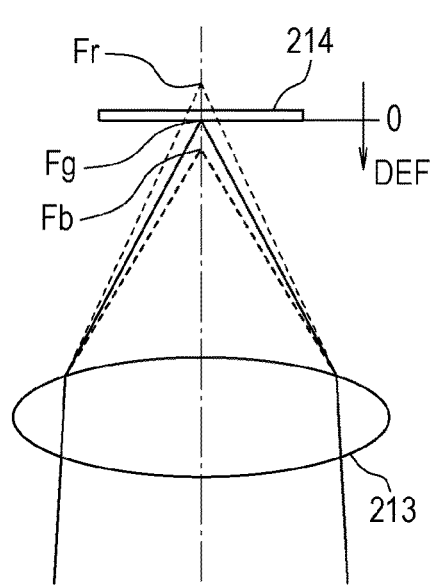
FIG. 3A is an illustration for describing the relation between the imaging position of a photometric lens and the position of a photometric sensor in a state a, and FIG. 3B is an illustration for describing the relation between the imaging position of the photometric lens and the position of the photometric sensor in a state b.
Figure 3B:
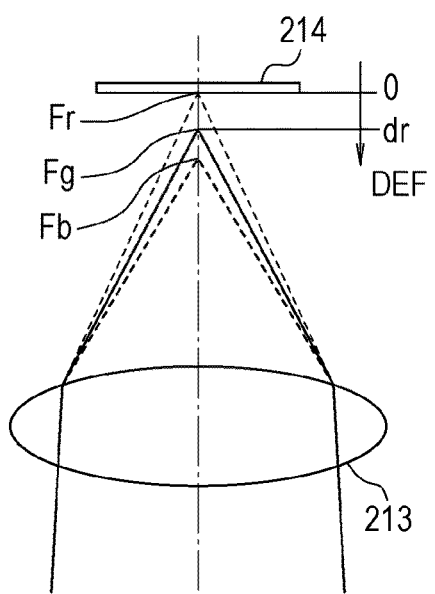

FIGS. 3A and 3B are illustrations for describing the relation between the imaging position of the photometric lens 213 and the position of the photometric sensor 214.

Due to the size or cost constraint of the camera, the photometric lens 213 is often constituted by one or two lenses, and aberration, such as on-axis chromatic aberration, occurs in such a case.

FIGS. 3A and 3B illustrate imaging positions Fr, Fg, and Fb on the optical axis of the light rays at wavelengths corresponding to the dominant wavelengths of the respective colors of R, G, and B in the photometric sensor 214. The wavelengths are in a relation of B<G<R, and the photometric lens 213 exhibits a higher refractive index to a light ray of a shorter wavelength. Accordingly, the imaging position Fb of B is closer to the photometric lens 213 than the imaging position Fg of G is, and the imaging position Fr of R is farther from the photometric lens 213 than the imaging position Fg of G is. Such a phenomenon is generally referred as on-axis chromatic aberration.

The defocus amount DEF is defined as the amount by which the imaging position Fg of G is offset from the surface of the photometric sensor 214. The defocus amount DEF is positive when the imaging position Fg is offset toward the photometric lens 213 relative to the surface of the photometric sensor 214 and is negative when the imaging position Fg is offset away from the photometric lens 213 relative to the surface of the photometric sensor 214.

FIGS. 3A and 3B illustrate the imaging performance on the optical axis in the state a and the state b, respectively. In the state a, the imaging position of the photometric lens 213 and the position of the photometric sensor 214 are in the designed relation, and DEF is 0. In the manufacturing process, the photometric sensor 214 and the photometric lens 213 are positioned relative to each other by a holding member or the like (not illustrated) so that DEF is 0 and are fixed. Meanwhile, in the state b, DEF has become dr due to various factors including a manufacturing error, a change over time, a change in temperature, and a change in humidity. The value dr is the value of DEF when the imaging position Fr coincides with the position of the surface of the photometric sensor 214, and dr is greater than 0.

FIG. 4 is a characteristic diagram illustrating the relation between the defocus amount DEF and the imaging performance IP. In FIG. 4, the horizontal axis represents the defocus amount DEF, and the vertical axis represents the imaging performance IP.

The imaging performance IP represents the resolution of each color reproduced by the photometric lens 213 and the photometric sensor 214 and is divided by a maximum value of the resolution of G for convenience. The imaging performance of R, G, and B is represented by IPr, IPg, and IPb, respectively. In the state a, DEF is 0, and thus IPg takes the maximum value (100%). Meanwhile, in the state b, DEF is dr, and thus IPr takes the maximum value.

The object detection operation of the camera according to the present exemplary embodiment will now be described.

The object detection operation is carried out with the use of an output of the photometric sensor 214. Therefore, the photometric area 231 serves as an object detection range. In the object detection operation, in order to detect a smaller object image, a high pixel density object detection image of 640 pixels (horizontal) by 480 pixels (vertical) generated from an output of the photometric sensor 214 is used.

In addition, in the present exemplary embodiment, detection of a human face serving as a target of the detection in the object detection operation will be described as an example. There are a variety of methods of detecting a human face, and a method in which a feature portion of a face, such as an eye, a nose, and a mouth, is extracted from information for detecting an object obtained from the photometric sensor 214 and a determination of a face is made is used.

The object detection image is generated from a signal for detecting an object calculated by multiplying output values of the respective colors of R, G, and B of the photometric sensor 214 by weighting coefficients. By placing a larger weight on a color of a higher resolution, the resolution of the object detection image increases, and the accuracy in detecting the object increases in turn. Accordingly, the weighting coefficients Wr, Wg, and Wb of the respective colors of R, G, and B are determined from the numerical values of the imaging performance IPr, IPg, and IPb of the respective colors of R, G, and B in accordance with the following weighting coefficient calculation formulas.

$$Wr = IPr/(IPr+IPg+IPb)$$

$$Wg = IPg/(IPr+IPg+IPb)$$

$$Wb = IPb/(IPr+IPg+IPb)$$

FIG. 5 is a table for describing the relation between the imaging performance and the weighting coefficients.

As the initial values of the weighting coefficients, the weighting coefficients Wr, Wg, and Wb calculated from the numerical values of IPr, IPg, and IPb in the state a are stored in the EEPROM 218 as the initial values of the respective weighting coefficients. Thus, when the camera is in the state a at the time of photographing, a high-resolution object detection image is generated.

However, when the camera is in the state b at the time of photographing due to various factors including a manufacturing error, a change over time, a change in temperature, and a change in humidity, an object detection image in which a color of a lower resolution is weighted is generated if the weighting coefficients Wr, Wg, and Wb in the state a are used. Thus, the resolution of the object detection image is reduced, and the accuracy in detecting the object decreases in turn.

Accordingly, in the present exemplary embodiment, the imaging performance IPr, IPg, and IPb of the respective colors of R, G, and B are calculated prior to photographing, and the weighting coefficient acquisition operation of calculating the weighting coefficients from the calculated values is carried out. Thus, a deterioration in the object detection image is suppressed.

With reference to FIGS. 6, 7, 8A, 8B, and 8C, the photographing operation of the camera according to the present exemplary embodiment will be described.

Figure 6:
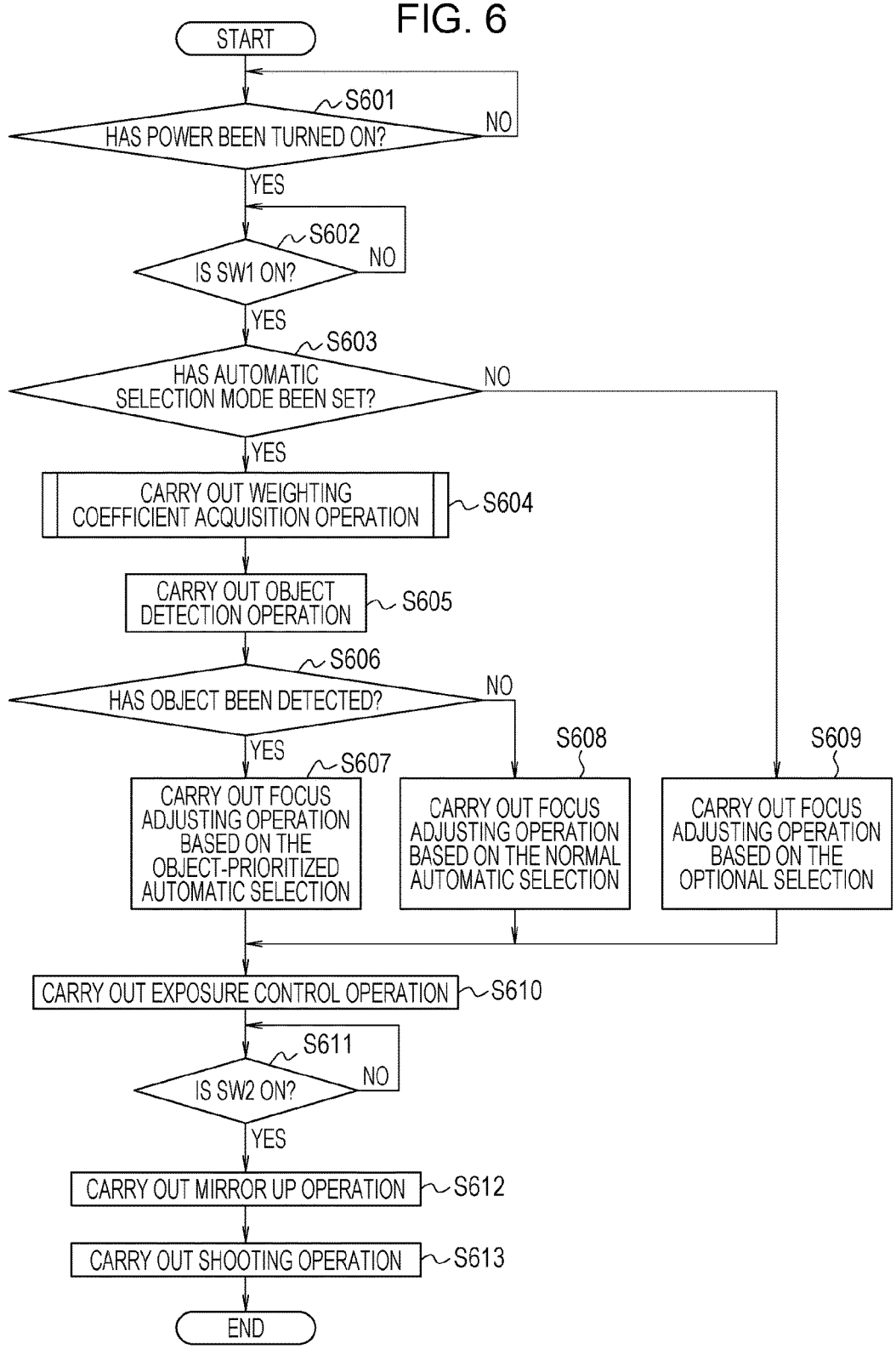
FIG. 6 is a flowchart illustrating an operation of a single-lens reflex camera according to an exemplary embodiment.

FIG. 6 is a flowchart illustrating the operation of the camera according to the present exemplary embodiment.

In step S601, when the power of the camera is turned on, the processing proceeds to step S602. Step S601 is repeated until the power of the camera is turned on.

In step S602, the CPU 217 determines whether the release button has been pressed halfway by the user (whether SW1 is ON). If it is determined that the release button has been pressed halfway, the processing proceeds to step S603. Step S602 is repeated until it is determined that the release button has been pressed halfway.

In step S603, the CPU 217 determines whether the method of selecting the focus detection area set by the user is the automatic selection mode. If the automatic selection mode is set, the processing proceeds to step S604. Meanwhile, if the automatic selection mode is not set, or in other words, if the optional selection mode is set, the processing proceeds to step S609.

In step S604, the weighting coefficient acquisition operation of calculating the weighting coefficients is carried out under the control of the CPU 217. The details of the weighting coefficient acquisition operation will be described later. Upon the weighting coefficient acquisition operation being completed, the processing proceeds to step S605.

In step S605, the object detection operation is carried out under the control of the CPU 217. At this point, an object detection image is generated in accordance with the weighting coefficients acquired in step S604. Upon the object detection operation being completed, the processing proceeds to step S606.

In step S606, the CPU 217 determines whether a predetermined object is present within the field on the basis of the result of the object detection operation in step S605. If a predetermined object is present, the processing proceeds to step S607. Meanwhile, if a predetermined object is not present, the processing proceeds to step S608.

In step S607, the focus adjusting operation based on the object-prioritized automatic selection described above is carried out under the control of the CPU 217. Upon the focus adjusting operation being completed, the processing proceeds to step S610.

In step S608, the focus adjusting operation based on the normal automatic selection described above is carried out under the control of the CPU 217. Upon the focus adjusting operation being completed, the processing proceeds to step S610.

In step S609, the focus adjusting operation based on the optional selection described above is carried out under the control of the CPU 217. Upon the focus adjusting operation being completed, the processing proceeds to step S610.

In step S610, the exposure control operation is carried out under the control of the CPU 217. Upon the exposure control operation being completed, the processing proceeds to step S611.

In step S611, the CPU 217 determines whether the release button has been pressed all the way by the user (whether SW2 is ON). If it is determined that the release button has been pressed all the way, the processing proceeds to step S612. Step S611 is repeated until it is determined that the release button has been pressed all the way.

In step S612, a mirror up operation is carried out under the control of the CPU 217. Upon the main mirror 201 and the sub-mirror 202 being retracted to the second position, the processing proceeds to step S613.

In step S613, the photographing operation is carried out under the control of the CPU 217. The CPU 217 transmits a signal to each of a shutter control unit (not illustrated), a stop driving unit (not illustrated), and an image sensor control unit (not illustrated). The image sensor 205 photoelectrically converts an object image projected by the lens unit 100 and outputs an analog signal. The analog signal output by the image sensor 205 is processed by the image sensor control unit (not illustrated) and an image processing unit (not illustrated), and the photographed image is generated. Upon the photographing operation being completed, the entire process of the camera is completed.

FIG. 7 is a flowchart illustrating the details of the weighting coefficient acquisition operation in step S604.

In step S701, the mirror up operation is carried out under the control of the CPU 217. Upon the main mirror 201 and the sub-mirror 202 being retracted to the second position, the processing proceeds to step S702. In step S702, under the control of the CPU 217, the PN liquid crystal panel 208 displays the focus detection area 230a, and the PN liquid crystal panel illumination device 209 illuminates the PN liquid crystal panel 208.

Figure 8A:
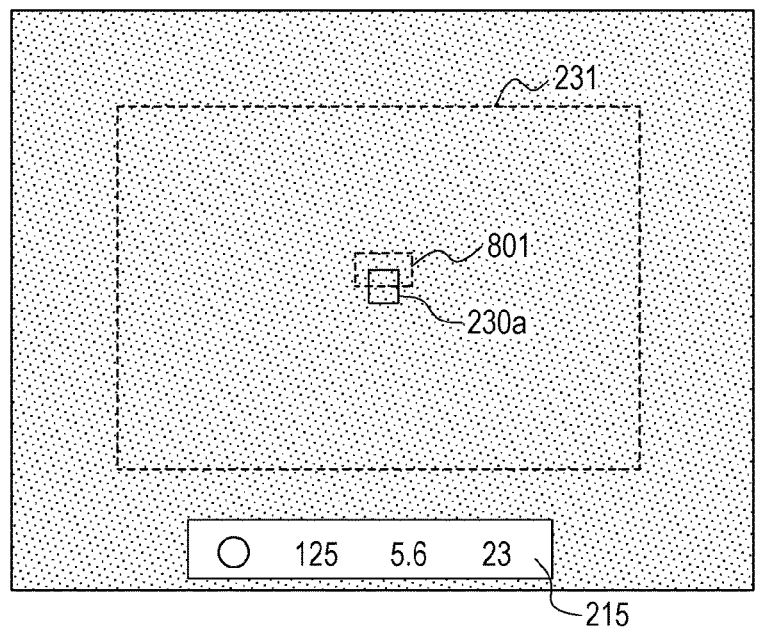
FIG. 8A illustrates a display range that a user can visually recognize through an eyepiece.
Figure 8B:
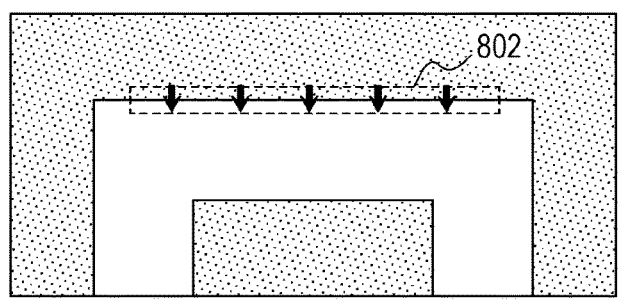
FIG. 8B is an enlarged view of an imaging performance evaluation area of an image for calculating the imaging performance.
Figure 8C:
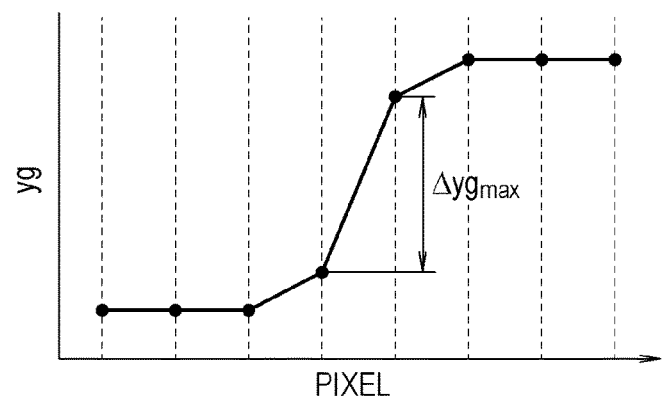
FIG. 8C is an illustration for describing a method of calculating the imaging performance in the weighting coefficient acquisition operation.

FIGS. 8A, 8B, and 8C are illustrations for describing the method of calculating the imaging performance in the weighting coefficient acquisition operation according to the present exemplary embodiment. FIG. 8A illustrates the overall display that the user can visually recognize through the eyepiece 211, and FIG. 8B is an enlarged view of an imaging performance evaluation area of an image for calculating the imaging performance. The PN liquid crystal panel 208 displays the focus detection area 230a corresponding to an imaging performance evaluation area 801. The PN liquid crystal panel illumination device 209 illuminates the PN liquid crystal panel 208 with a white light source. The reason why the white light source of the PN liquid crystal panel illumination device 209 is used is that a light source that includes dominant wavelengths of the respective colors of R, G, and B is suitable for calculating the imaging performance IPr, IPg, and IPb. Since the mirrors have been moved up in step S701 and light toward the photometric sensor 214 from the outside of the camera is being blocked, the photometric area 231 is displayed darkly except for the focus detection area 230a, as illustrated in FIGS. 8A and 8B. Upon the PN liquid crystal panel 208 displaying the focus detection area 230a and upon the PN liquid crystal panel illumination device 209 illuminating the PN liquid crystal panel 208, the processing proceeds to step S703.

Referring back to FIG. 7, in step S703, a signal acquired by the photometric sensor 214 is output under the control of the CPU 217. When the signal of the photometric area 231 acquired by the photometric sensor 214 is output, the processing proceeds to step S704.

In step S704, a mirror down operation is carried out under the control of the CPU 217. When the main mirror 201 and the sub-mirror 202 are moved down to the first position, the processing proceeds to step S705.

In step S705, the CPU 217 calculates the imaging performance IP. The method of calculating the imaging performance IP will now be described. The CPU 217 generates an image for calculating the imaging performance on the basis of the signal output in step S702. The imaging performance IP of each color is calculated from the amount of change in the output value at an edge portion 802 of the focus detection area 230a, and the edge portion 802 is a portion with a large amount of change in the output value of each color in the imaging performance evaluation area 801 of the image for calculating the imaging performance. FIG. 8C illustrates an example of an output value yg of G in a given column when the output value yg is read out in a direction perpendicular to the edge portion 802 (i.e., the direction indicated by the arrows in FIG. 8B). A maximum value $\Delta yg_{max}$ of the amount of change in yg between adjacent pixels in each column is calculated. As $\Delta yg_{max}$ is greater, the resolution can be evaluated to be high.

Next, a mean value ave($\Delta yg_{max}$) of $\Delta yg_{max}$ in a plurality of columns is calculated. Thereafter, the imaging performance IPg of G is calculated by dividing the calculated mean value ave($\Delta yg_{max}$) by ave($\Delta yg_{max}$) at DEF=0 recorded in the EEPROM 218 in the manufacturing process and normalizing the result. In a similar manner, with respect to IPr and IPb, mean values ave($\Delta yr_{max}$) and ave($\Delta yb_{max}$) of maximum values of the amounts of change between adjacent pixels in respective columns are calculated, and the imaging performance IP is calculated through the following IP calculation formulas.

$$IPr = \{ave(\Delta yr\max)\}/\{ave(\Delta yg\max) \text{ at } DEF=0\}$$

$$IPg = \{ave(\Delta yg\max)\}/\{ave(\Delta yg\max) \text{ at } DEF=0\}$$

$$IPb = \{ave(\Delta yb\max)\}/\{ave(\Delta yg\max) \text{ at } DEF=0\}$$

Upon the imaging performance IP of each color being calculated in this manner, the processing proceeds to step S706.

In step S706, the CPU 217 calculates the weighting coefficients. The weighting coefficients Wr, Wg, and Wb are calculated from the imaging performance IP of each color calculated in step S705 with the use of the weighting coefficient calculation formulas. Upon the weighting coefficient being calculated, the processing proceeds to step S707. In step S707, the CPU 217 stores the weighting coefficients calculated in step S706 into the EEPROM 218. Upon the weighting coefficient being stored, the weighting coefficient acquisition operation is completed.

As described thus far, the imaging apparatus includes the photometric lens 213, which is a secondary imaging optical system, for forming a secondary image of object light that has been transmitted through the lens unit 100 and has had a primary image formed by the lens unit 100; the photometric sensor 214, which is an image sensor, for outputting a signal of the object light that is a secondary image; and the PN liquid crystal panel 208, which is a member in the vicinity of a primary imaging plane, located in the vicinity of the primary imaging plane. The imaging apparatus generates an image obtained by subjecting an output signal of the photometric sensor 214 to reforming processing on the basis of the output signal of the photometric sensor 214 when the PN liquid crystal panel 208 serves as an object. Thus, a deterioration in the image that could be caused by various factors including a manufacturing error, a change over time, a change in temperature, and a change in humidity can be suppressed. In particular, by reforming an object detection image, a deterioration of the accuracy in detecting an object can be prevented. In addition, by carrying out the weighting coefficient acquisition operation with the use of the PN liquid crystal panel illumination device 209, which is the light source within the camera, the imaging performance IP that is not dependent on the photographing environment can be calculated.

Thus far, exemplary embodiments of the present invention have been described, but the exemplary embodiments described above merely illustrate specific examples for implementing the present invention, and the technical scope of the present invention is not to be interpreted as being limited by these exemplary embodiments. In other words, the present invention can be implemented in various forms without departing from the technical spirit or the principal features of the present invention.

For example, in the above exemplary embodiments, the image reforming processing on an object detection image obtained by the photometric lens 213 has been described. However, the present invention is not limited thereto, and the reforming processing can be carried out on other images.

In addition, in the exemplary embodiments described above, the PN liquid crystal panel 208 is used as the member in the vicinity the primary imaging plane, but the viewfinder field frame 207 or the focus detection plate 206 may instead be used as the member in the vicinity of the primary imaging plane.

In addition, in the exemplary embodiments described above, the weighting coefficients are changed in accordance with the condition of the camera, but the weighting coefficients can also be changed in accordance with the image height.

In addition, in the present exemplary embodiment, an example in which a signal obtained by adding signals corresponding to different wavelength bands is used to detect an object has been described, but the signal obtained by adding the signals may be used to detect contrast of information obtained from an image sensor and to adjust the focus. Different processing may also be employed as long as such processing utilizes an edge condition of the object.

Other Exemplary Embodiments

The present invention can also be implemented through processing in which a program that implements one or more functions of the exemplary embodiments described above is supplied to a system or an apparatus via a network or in the form of a storage medium and one or more processors in the system or the apparatus read out and execute the program. In addition, the exemplary embodiments can also be implemented by a circuit (e.g., application specific integrated circuit (ASIC)) that implements one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-078325 filed Apr. 7, 2015, which is hereby incorporated by reference herein in its entirety.

What is claimed is:

1. An imaging apparatus, comprising:
  a secondary imaging optical system configured to form a secondary image of object light that has had a primary image formed;
  an image sensor having two or more types of spectral sensitivity characteristics and configured to output a signal of an object image that is the secondary image formed by the secondary imaging optical system; and
  a signal processor configured to calculate a resolution of the signal corresponding to each of the spectral sensitivity characteristics on the basis of an output signal of the image sensor when a member in the vicinity of a primary imaging plane serves as an object, and generate an image with a weight of a signal corresponding to each type of the spectral sensitivity characteristics output by the image sensor being varied on the basis of the resolution of the signal corresponding to each of the spectral sensitivity characteristics,
  wherein the signal processor increases the weight of a signal as the resolution of the signal corresponding to the spectral sensitivity characteristics is higher.

2. The imaging apparatus according to claim 1, wherein the member in the vicinity of the primary imaging plane is at least one of a focus detection plate for diffusing the object light that has had the primary image formed, a frame for blocking a peripheral portion of light that has been diffused by and transmitted through the focus detection plate, and a display device for displaying information related to photographing.

3. The imaging apparatus according to claim 1, wherein the image generated by the signal processor is at least one of an image for detecting an object generated in order to detect a predetermined object in a field and an image to be used to adjust a focus.

4. The imaging apparatus according to claim 1, further comprising:
  an illumination device configured to illuminate the member in the vicinity of the primary imaging plane; and
  a light-blocking member configured to shield the image sensor from light from the outside of the imaging apparatus.

5. An imaging apparatus, comprising:
an image sensor configured to receive object light via at least one member of a focus detection plate for diffusing the object light that has had a primary image formed, a frame for blocking a peripheral portion of light that has been diffused by and transmitted through the focus detection plate, and a display device for displaying information related to photographing; and
a signal processor configured to calculate a resolution of the signal corresponding to each of the spectral sensitivity characteristics on the basis of an output signal of the image sensor when the at least one member serves as an object, and generate an image with a weight of a signal corresponding to each type of spectral sensitivity characteristics of the image sensor output by the image sensor being varied on the basis of the resolution of the signal corresponding to each of the spectral sensitivity characteristics,
wherein the signal processor increases the weight of a signal as the resolution of the signal corresponding to the spectral sensitivity characteristics is higher.

6. The imaging apparatus according to claim 5,
wherein the image generated by the signal processor is at least one of an image for detecting an object generated in order to detect a predetermined object in a field and an image to be used to adjust a focus.

7. A method of controlling an imaging apparatus that includes a secondary imaging optical system configured to form a secondary image of object light that has had a primary image formed and an image sensor having two or more types of spectral sensitivity characteristics and configured to output a signal of an object image that is the secondary image formed by the secondary imaging optical system, the method comprising:
calculating a resolution of the signal corresponding to each of the spectral sensitivity characteristics on the basis of an output signal of the image sensor when a member in the vicinity of a primary imaging plane serves as an object; and
generating an image with a weight of a signal corresponding to each type of the spectral sensitivity characteristics output by the image sensor being varied on the basis of the resolution of the signal corresponding to each of the spectral sensitivity characteristics,
wherein the weight of a signal is increased as the resolution of the signal corresponding to the spectral sensitivity characteristics is higher.

8. A method of controlling an imaging apparatus that includes an image sensor configured to receive object light via at least one member of a focus detection plate for diffusing the object light that has had a primary image formed, a frame configured to block a peripheral portion of light that has been diffused by and transmitted through the focus detection plate, and a display device configured to display information related to photographing, the method comprising:
calculating a resolution of the signal corresponding to each of the spectral sensitivity characteristics on the basis of an output signal of the image sensor when a member in the vicinity of a primary imaging plane serves as an object; and
generating an image with a weight of a signal corresponding to each type of spectral sensitivity characteristics of the image sensor output by the image sensor being varied on the basis of the resolution of the signal corresponding to each of the spectral sensitivity characteristics,
wherein the weight of a signal is increased as the resolution of the signal corresponding to the spectral sensitivity characteristics is higher.

* * * * *